(12) United States Patent
Ionasec

(10) Patent No.: US 11,537,826 B2
(45) Date of Patent: Dec. 27, 2022

(54) DETERMINING A PROCESSING SEQUENCE FOR PROCESSING AN IMAGE

(71) Applicant: Siemens Healthcare GmbH, Erlangen (DE)

(72) Inventor: Razvan Ionasec, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 416 days.

(21) Appl. No.: 16/674,196

(22) Filed: Nov. 5, 2019

(65) Prior Publication Data
US 2020/0151523 A1    May 14, 2020

(30) Foreign Application Priority Data
Nov. 13, 2018    (EP) ..................... 18205964

(51) Int. Cl.
*G06K 9/62* (2022.01)
*G06F 17/18* (2006.01)
*G06N 7/00* (2006.01)
*G06N 20/00* (2019.01)

(52) U.S. Cl.
CPC ........... *G06K 9/6297* (2013.01); *G06F 17/18* (2013.01); *G06N 7/005* (2013.01); *G06N 20/00* (2019.01)

(58) Field of Classification Search
CPC ...... G06K 9/6297; G06N 20/00; G06N 7/005; G06F 17/18
See application file for complete search history.

(56) References Cited

U.S. PATENT DOCUMENTS

| 2002/0169735 | A1  | 11/2002 | Kil |  |
| 2005/0047646 | A1* | 3/2005  | Jojic | G06K 9/6297 |
|              |     |         |       | 382/173 |
| 2014/0104450 | A1  | 4/2014  | Cox |  |
| 2017/0200090 | A1  | 7/2017  | Hershey et al. |  |
| 2017/0317983 | A1* | 11/2017 | Kompalli | G06V 30/40 |
| 2019/0163875 | A1* | 5/2019  | Allen | G16H 10/60 |

OTHER PUBLICATIONS

Lukac, Martin et al. "An algorithm selection based platform for image understanding using high-level symbolic feedback and machine learning" International Journal of Machine Learning and Cybernetics, vol. 6, No. 3, pp. 417-434, Sep. 2013 // https://doi.org/10.1007/s13042-013-0197-x.
Chattopadhyay, T. et al. "Automatic Selection of Binarization Method for Robust OCR" 12th International Conference on Document Analysis and Recognition, Aug. 2013 (IEEE) // DOI: 10.1109/ICDAR.2013.237.
European Search Report for European Patent Application No. 18205964.2 dated Jul. 23, 2019.

* cited by examiner

*Primary Examiner* — David F Dunphy
(74) *Attorney, Agent, or Firm* — Harness, Dickey & Pierce P.L.C.

(57) ABSTRACT

A method is for determining a processing sequence for processing an image, the processing sequence including a plurality of algorithms, each respective algorithm of the plurality of algorithms being configured to perform an image processing process on the image to generate a respective output. In an embodiment, the method includes determining one or more required outputs from the processing sequence; and determining, using a data processing system, the processing sequence based on the one or more required outputs determined, the data processing system being configured based on sequences previously determined.

16 Claims, 6 Drawing Sheets

Fig 1    100
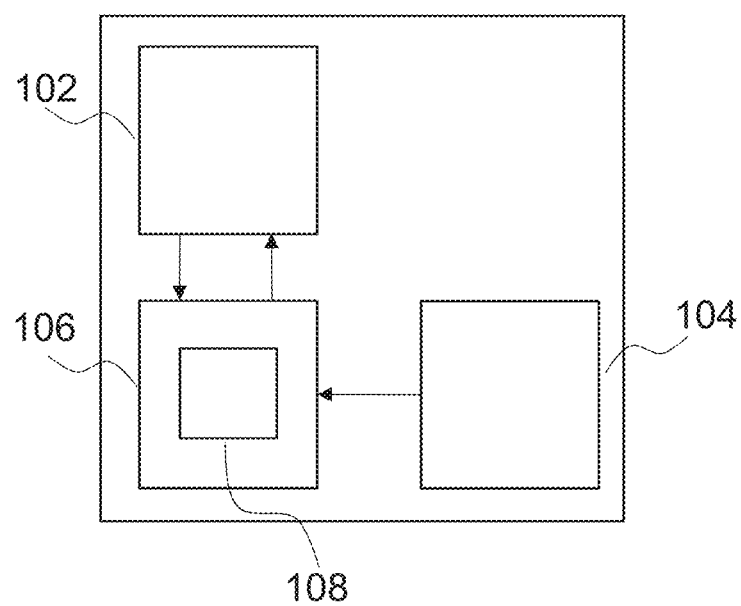
Fig 2    200
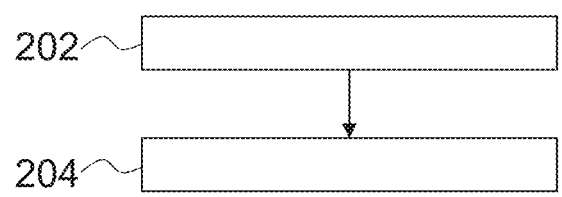

DETERMINING A PROCESSING SEQUENCE FOR PROCESSING AN IMAGE

PRIORITY STATEMENT

The present application hereby claims priority under 35 U.S.C. § 119 to European patent application numbers EP18205964.2 filed Nov. 13, 2018, the entire contents of which are hereby incorporated herein by reference.

FIELD

Embodiments of the invention generally relate to methods, systems and computer program products for determining a processing sequence for processing an image.

BACKGROUND

Artificial Intelligence systems are increasingly being used for processing images. In complex image processing applications, such as processing of medical images, an increasing number of algorithms are being used in an interconnected manner to perform more difficult image processing tasks.

Image processing systems which combine multiple algorithms often apply the algorithms in a predetermined order, which is assumed to be optimal. Other image processing systems employ heuristics that comprise a collection of pre-defined rules and pre-defined parameter to determine the order in which a sequence of algorithms is applied. For example, the collection of rules may be of the type "if then else", such that the result of one algorithm determines which subsequent algorithm to apply next.

SUMMARY

The inventors have recognized that such approaches to determining the order in which a sequence of algorithms is applied may not produce an optimal sequence and therefore may not produce an optimal result, particularly when applied to dynamic imaging applications and/or in systems in which the pool of available algorithms changes over time and/or the properties of the individual algorithms are not known and/or as the complexity of the data processed increases.

These problems are improved upon or even solved or mitigated by the method of an embodiment, by the data processing system of an embodiment, and/or by the computer program product of an embodiment. The claims are related to further aspects of the invention.

At least one embodiment of the invention relates in one aspect to a method of determining a processing sequence for processing an image, the processing sequence comprising a plurality of algorithms, each of the algorithms being configured to perform an image processing process on the image to generate a respective output, the method comprising;
  determining one or more required outputs from the processing sequence; and
  using a data processing system to determine the processing sequence based on the one or more required outputs, the data processing system being configured based on previously determined sequences.

At least one embodiment of the invention relates in one aspect to a data processing system for determining a processing system for processing an image, the processing sequence comprising a plurality of algorithms, each of the algorithms being configured to perform an image processing process on the image to generate a respective output, the data processing system comprising a processor arranged to:
  determine one or more required outputs from the processing sequence; and
  determine the processing sequence based on the one or more required outputs, the data processing system being configured based on previously determined sequences.

At least one embodiment of the invention relates in one aspect to a computer program, the computer program being loadable into a memory unit of a data processing system, including program code sections to make a data processing system execute the method according to an aspect of the invention when the computer program is executed in said data processing system.

The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

At least one embodiment of the invention relates to a method of determining a processing sequence for processing an image, the processing sequence including a plurality of algorithms, each respective algorithm of the plurality of algorithms being configured to perform an image processing process on the image to generate a respective output, the method comprising;
  determining one or more required outputs from the processing sequence; and
  determining, using a data processing system, the processing sequence based on the one or more required outputs determined, the data processing system being configured based on sequences previously determined.

At least one embodiment of the invention relates to a data processing system for determining a processing sequence for processing an image, the processing sequence including a plurality of algorithms, each respective algorithm of the plurality of algorithms being configured to perform an image processing process on the image to generate a respective output, the data processing system comprising:
  a processor arranged to:
    determine one or more required outputs from the processing sequence; and
    determine the processing sequence based on the one or more required outputs determined, the data processing system being configured based on previously sequences determined.

At least one embodiment of the invention relates to a non-transitory computer readable medium storing a computer program, the computer program including program code sections to make a data processing system execute the method of claim 1 when the computer program is executed in the data processing system.

BRIEF DESCRIPTION OF THE DRAWINGS

The invention will be illustrated below with reference to the accompanying figures using example embodiments. The illustration in the figures is schematic and highly simplified and not necessarily to scale.

FIG. 1 is a schematic diagram of a data processing system according to one embodiment of the invention;

FIG. 2 is a simplified workflow diagram illustrating a method according to one embodiment of the invention;

DETAILED DESCRIPTION OF THE EXAMPLE EMBODIMENTS

Figure 3A:
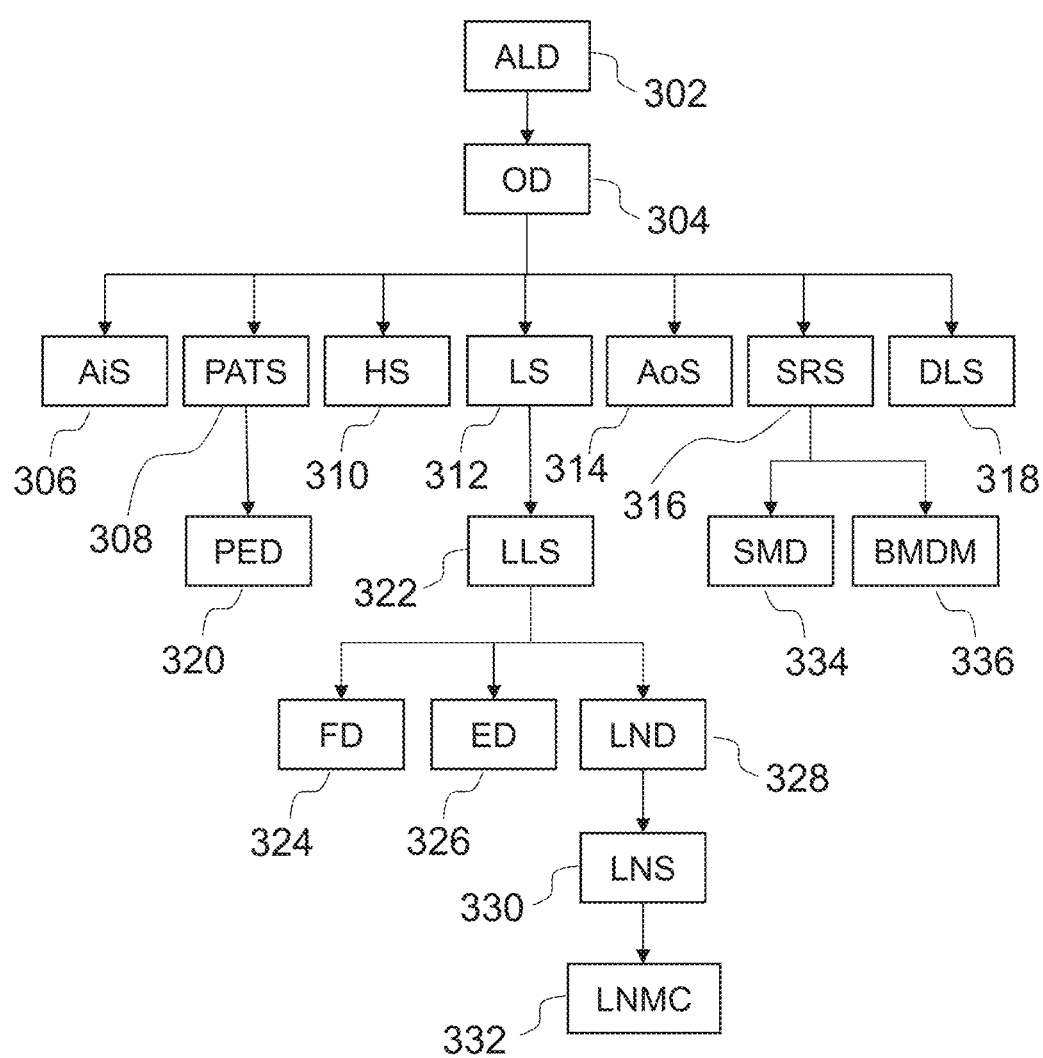
FIG. 3a is a schematic diagram illustrating an artificial intelligence system for abnormality identification and classification from chest CT images, according to an example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates in one aspect to a method of determining a processing sequence for processing an image, the processing sequence comprising a plurality of algorithms, each of the algorithms being configured to perform an image processing process on the image to generate a respective output, the method comprising;
  determining one or more required outputs from the processing sequence; and
  using a data processing system to determine the processing sequence based on the one or more required outputs, the data processing system being configured based on previously determined sequences.

One embodiment of the invention relates in one aspect to a method wherein the data processing system comprises a data model, the data model representing a plurality of transition probabilities and a plurality of output probabilities, each of the plurality of transition probabilities representing a probability of a sequential order between respective algorithms of the plurality of algorithms, and each of the output probabilities representing a probability of an algorithm of the plurality of algorithms generating a respective output.

One embodiment of the invention relates in one aspect to a method wherein the data model is a Hidden Markov Model.

One embodiment of the invention relates in one aspect to a method wherein determining the processing sequence comprises solving the Hidden Markov Model using a Viterbi algorithm.

One embodiment of the invention relates in one aspect to a method wherein the data processing system comprises producing an execution graph representing the processing sequence.

One embodiment of the invention relates in one aspect to a method comprising receiving an output from a first algorithm in the processing sequence and changing an order in which subsequent algorithms in the processing sequence are to be executed on the basis of the output from the first algorithm.

One embodiment of the invention relates in one aspect to a method comprising executing image processing algorithms according to the determined processing sequence.

At least one embodiment of the invention relates in one aspect to a data processing system for determining a processing system for processing an image, the processing sequence comprising a plurality of algorithms, each of the algorithms being configured to perform an image processing process on the image to generate a respective output, the data processing system comprising a processor arranged to:
  determine one or more required outputs from the processing sequence; and
  determine the processing sequence based on the one or more required outputs, the data processing system being configured based on previously determined sequences.

At least one embodiment of the invention relates in one aspect to a computer program, the computer program being loadable into a memory unit of a data processing system, including program code sections to make a data processing system execute the method according to an aspect of the invention when the computer program is executed in said data processing system.

The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

Reference is made to the fact that the described methods and the described data processing systems are merely preferred example embodiments of the invention and that the invention can be varied by a person skilled in the art, without departing from the scope of the invention provided it is specified by the claims.

FIG. 1 is a diagram illustrating a data processing system 100 according to an embodiment of the present invention. The data processing system 100 comprises a processor 102 configured to determine a processing sequence for processing an image, according to the methods described herein. The data processing system 100 may, for example, operate on a computing device, such as a workstation, desktop computer or laptop computer, or may operate on server, or may operate in a cloud environment. In particular, the processing sequence comprises a plurality of algorithms, each of which is configured to perform an image processing process on an image to generate a respective output.

The data processing system 100 also comprises a communications interface 104 for receiving data, and a memory 106 for storing received data.

The data received at the communications interface 104 may include image data, data indicative of the algorithms, and/or data representative of one or more required outputs from the processing sequence.

The memory 106 may be arranged to store data in the form of a model 108 that may be trained prior to installation and use of the data processing system 100 in an operation setting. The model 108 may, for example, be a Hidden Markov Model (HMM). A HMM is a statistical model in which the system being modeled is assumed to be a Markov process with unobserved (i.e. hidden) states. In the context of the model 108, the hidden states of the HMM may correspond with the algorithms from an algorithm pool and observations correspond with input data including the one or more required outputs and other input data.

Training of the model 108 may be performed prior to installation of the data processing system 100 in an operating environment. However, the model 108 of the data processing system 100 may be updated after installation. In particular, as the pool of available algorithms changes, the model 108 may be trained to utilize newly available algorithms and/or to not specify algorithms which are no longer available or have been superseded.

The model 108 may be trained using a training set of examples to the process for determining the process sequence. In some examples, training may be performed using algorithms such as, for example, the Baum-Welch algorithm, or using other estimation-maximization approaches. In other examples, training may be performed using other data-driven learning or rule-based approach.

As described above, the model 108 may be, for example, a Hidden Markov Model (HMM). The parameters of the HMM may be estimated during the training phase. Given the one or more required outputs and the additional input data/parameters (i.e. the observation), and the HMM parameters, the model 108 may be trained to generate a processing sequence which is optimal, or close to optimal, for producing the required output and to generate a corresponding execution graph. In some embodiments, the HMM may be trained using a Viterbi algorithm, which is an algorithm for finding the most likely sequence of hidden states; this is sometimes referred to as a Viterbi path and is the path that results in a sequence of observed events.

The HMM is defined by different states (corresponding with the pool of algorithms), possible observations (which correspond with the input data and parameters), transition probabilities (for transitions between the states), and output probabilities. The transition probabilities represent probabilities of one state following another (i.e. that one algorithm will be executed after another algorithm). The output probabilities represent probabilities that a transition between one state and another (i.e. executing one algorithm after another algorithm) will produce a required output. For example, if the outcome of a particular algorithm requires the subsequent execution of another algorithm, the transition probability may represent the probability of a particular algorithm being performed subsequent to a previous algorithm dependent on the output probability of that previous algorithm.

During training of the HMM values for the transition probabilities and the observation probabilities (the probability of a given state (i.e. algorithm) being associated with a given observation) are set.

The model 108 may be trained by supplying training data to a neural network system and a machine learning algorithm may learn to determine a process sequence using the neural network system based on one or more required outputs and based on previously determined sequences.

The machine learning algorithm may be any suitable algorithm implementing a neural network for determining a processing sequence for processing images. For example, the machine learning algorithm may comprise convolutional neural network (CNN) algorithms or may be a fully convolutional neural network (FCN) algorithm. In another example, the machine learning algorithm may be a multi-layer perceptron (MLP) algorithm.

The memory 106 may also store a computer program executable by the processor 102, to perform the methods described herein, and specifically the method described below with reference to FIG. 2.

The memory 106, may be any suitable form of memory. For ex-ample, the memory 106 may comprise volatile memory, such as random-access memory (RAM) and/or non-volatile memory such as read only memory (ROM) or flash memory. Furthermore, the memory 106 might comprise multiple, separate, memory devices and may comprise a combination of volatile and non-volatile memory. In some examples, certain components of the invention, such as the computer program and/or the model, may be stored in one memory device, while other components may be stored in another memory device. In other examples, the memory may be an associative memory.

In some embodiments, the processor 102 may also be configured to perform image processing functions to process the image (i.e. to apply the algorithms) according to the determined processing sequence. The image processing may be performed on any image but in certain examples may be performed on a medical image. For example, the image may be acquired by a medical imaging device selected from the group consisting of an X-ray fluoroscopy device, a computed tomography device, a magnetic resonance imaging device, a molecular imaging device, a SPECT-device, a PET-device and combinations thereof. The medical imaging device can be, for example, a combination of an imaging modality and a therapy modality, in particular a radiation therapy modality. In some embodiments, the image mage be retrieved from a picture archiving and communication system (PACS); for example, the image may be routed to a data processing system using Digital Imaging and Communications in Medicine (DICOM) auto-routing. In some embodiments, the data processing system 100 may be part of an image acquisition system, such as a medical imaging device of the types described above. Alternatively, the data processing system 100 may be separate from the imaging device used to acquire an image and may be retrieved by the data processing system 100 or sent to the data processing system 100 via the communications interface 104.

FIG. 2 is a flow diagram depicting a method 200 of determining a sequence for processing an image, in which the processing sequence comprises a plurality of algorithms, each configured to perform an image processing process on the image to generate a respective output. For example, the method 200 may be implemented by the data processing system 100 described above with reference to FIG. 1.

At block 202, one or more required outputs from the processing sequence are determined. For example, with reference to FIG. 1, the data processing system 100 may receive, via the communications interface 104, data indicative of the one or more required outputs.

In medical imaging applications, the one or more required outputs may include one or more desired modifications to the image and/or extraction of one or more pieces of information from the image. In some embodiments, the required output may include a modification to the image; for example, the output may include one or more of: an annotation of the image; a measurement of one or more features identified in the image; and/or highlighting of one or more portions of the image. In another example, the output may include information derived from the image; for example, in the case of medical images, the information may include an indication of an anatomical abnormality, such a tumour and may include a classification of the abnormality determined based on, for example, a texture analysis of a portion of the image.

At block 204, using the data processing system, which is configured based on previously determined sequences, the processing sequence is determined based on the one or more required outputs. That is, the model 108 stored in the data processing system 100 may be trained (using training data and corresponding ground truth data) to determine a processing sequence based on the one or more required outputs.

In other words, the method 200 is a run-time approach for determining an improved sequence for performing image processing algorithms that enables the data processing system 100 to dynamically determine an appropriate order for executing a sequence of algorithms available in an algorithm pool.

In addition to the one or more required outputs, the model 108 of the data processing system 100 may be trained to determine the processing sequence based on other data, which may be received by the data processing system 100 via the communications interface 104. For example, the data processing system 100 may determine the processing sequence at least partly based on input parameters relating to the conditions under which the image was acquired. For example, the input parameters may include one or more of: acquisition parameters (such as, scanning speed, radiation power, and/or scanner resolution, for example), kilovolt level, gradients, Signal-to-Noise Ratio (SNR), Contrast-to-Noise Ratio (CNR) acquisition protocol, reconstruction parameters, kernel, iterative reconstruction, compressed sensing, slice thickness, contrast parameters, volume, brightness, and concentration.

Additionally, or alternatively, the data processing system 100 may determine the processing sequence at least partly based on anatomical parameters. For example, the data processing system 100 may receive data indicative of landmarks in the image, organs present in the image, anatomical abnormalities present in the image and/or foreign bodies (such as medical instruments) present in the image.

Additionally, or alternatively, the data processing system 100 may determine the processing sequence at least partly based on clinical parameters. For example, the data processing system 100 may receive data indicative of missing anatomical features (for example, anatomical features that have been removed by surgery, such as a lung lobe removed by lobectomy), the presence of fibrosis, disease-state malignant nodule and lymph nodes, and treatment states.

In some embodiments, the data processing system 100 may generate a so-called "execution graph" representative of the determined processing sequence. The execution graph specifies the sequence of algorithms to be executed. The execution graph comprises nodes corresponding to ones of the available algorithms from the algorithm pool, and transitions that determine the sequence of execution of the algorithms.

The execution graph, generated by the model 108 based on the one or more required outputs and/or the input parameters, anatomical parameters and/or clinical parameters, as well of the previous experience, may in some embodiments be displayed to a user. In other embodiments, the execution graph may not be displayed to the user and may exist only in data used by the data processing system 100 to process the image or presented to a separate image processing system to instruct the sequence in which the image processing algorithms are to be executed.

FIG. 3a is a schematic diagram of an example of an artificial intelligence system 300 comprising a pool of artificial intelligence algorithms for processing images, one or more of which the artificial intelligence system 300 may apply to an image to process the image. In the example shown in FIG. 3a, the artificial intelligence system 300 is for processing a computed tomography (CT) image of the chest of a human patient and for performing abnormality identification and classification. In the example shown in FIG. 3a, the pool of algorithms includes: an anatomical landmark detection (ALD) algorithm 302, an organ detection (OD) algorithm 304, an airways segmentation (AiS) algorithm 306, a pulmonary artery tree segmentation (PATS) algorithm 308, a heart segmentation (HS) algorithm 310, a lung segmentation (LS) algorithm 312, an aorta segmentation (AoS) algorithm 314, a spine and rib segmentation (SRS) algorithm 316, a diaphragm and liver segmentation (DLS) algorithm 318, a pulmonary embolism detection (PED) algorithm 320, a lung lobe segmentation (LLS) algorithm 322, a fibrosis detection (FD) algorithm 324, an empyema detection (ED) algorithm 326, a lung nodule detection (LND) algorithm 328, a lung nodule segmentation (LNS) algorithm 330, a lung nodule malignancy classifier (LNMC) algorithm 332, a spine metastases detection (SMD) algorithm 334, and a bone mineral density measurement (BMDM) algorithm 336.

Figure 3B:
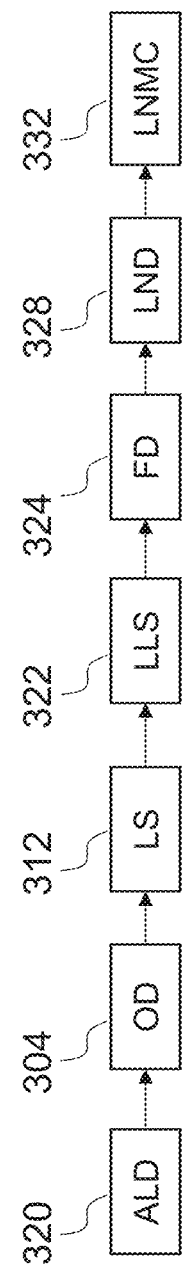
FIG. 3b is a schematic diagram illustrating a default processing sequence for execution by an artificial intelligence system for abnormality identification and classification from chest CT images, according to an example embodiment.

FIG. 3b shows an example of an execution graph 300a for the data processing system 100 operating in a default operating mode in response to a request for a required output. As shown in FIG. 3b, an output from the anatomical landmark detection (ALD) algorithm 302 may trigger execution of the organ detection (OD) algorithm 304, which then sequentially triggers execution of the lung segmentation (LS) algorithm 312, the lung lobe segmentation (LLS) algorithm 322, the fibrosis detection (FD) algorithm 324, the lung nodule detection (LND) algorithm 328, and the lung nodule malignancy classifier (LNMC) algorithm 332. However, the ability of the artificial intelligence system 300 to produce a required output (i.e. the quality and/or accuracy of the output of the artificial intelligence system 300) is dependent on the sequence in which the individual algorithms are executed because the output of one algorithm serves as the input to the next algorithm in the sequence. Accordingly, in many cases the default mode may not produce an optimal result.

In some embodiments, the artificial intelligence system 300 may have a predefined default interaction between individual component algorithms of the pool of algorithms for a given request for a required output. In the example shown in FIG. 3a, these are shown by arrows linking the individual algorithm components. In the absence of further control of the artificial intelligence system 300, based on a processing sequence provided by the model 108, output by certain ones of the algorithms may trigger execution of a subsequent algorithm in the default sequence of algorithms.

Figure 4A:
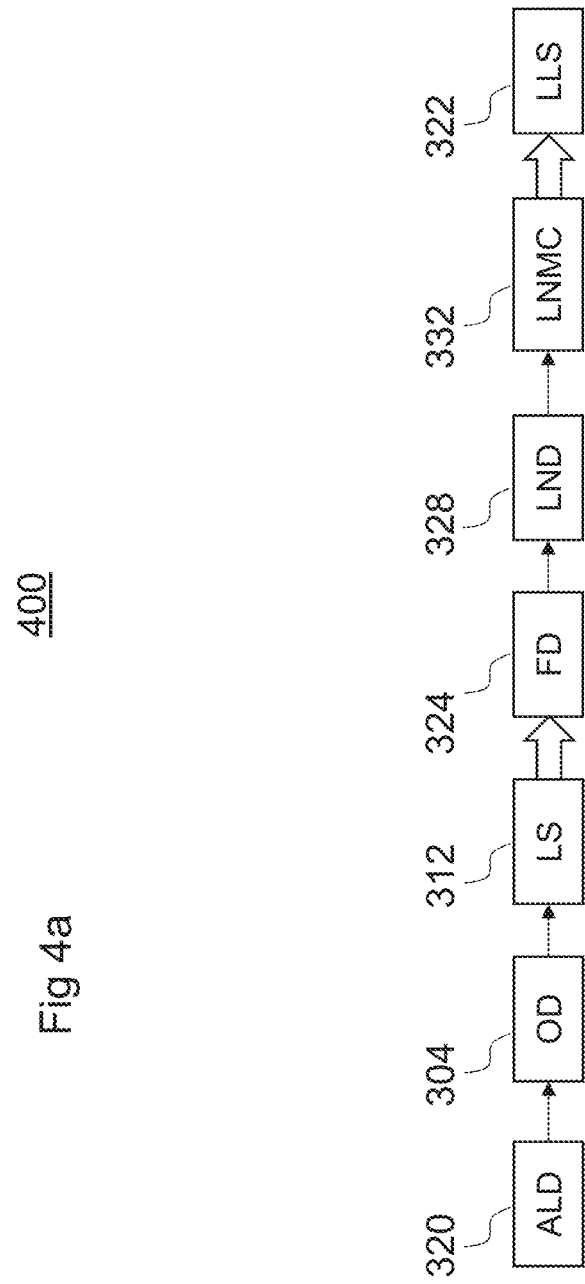
FIG. 4a is a schematic diagram illustrating a processing sequence for execution by an artificial intelligence system for abnormality identification and classification from chest CT images, according to an example embodiment.

However, in some examples, dependent on the required outputs and the input data, the default mode may not produce an optimal output or may even produce an erroneous output. For example, if the slice thickness of an image is greater than a threshold value, image processing algorithms may produce erroneous results. For example, in relation to the example described above with reference to FIG. 3a, if the slice thickness is greater than approximately 3 mm, the lung lobe segmentation (LLS) algorithm 322 may produce an erroneous result and therefore that result may not be useful as an input for the fibrosis detection (FD) algorithm 324. Accordingly, as shown in FIG. 4a, the data processing system 100 may determine a processing sequence 400 and, in some examples, generate a corresponding execution graph in which the algorithm which might be expected to produce an erroneous result is shifted to the end of the processing sequence.

Figure 4B:
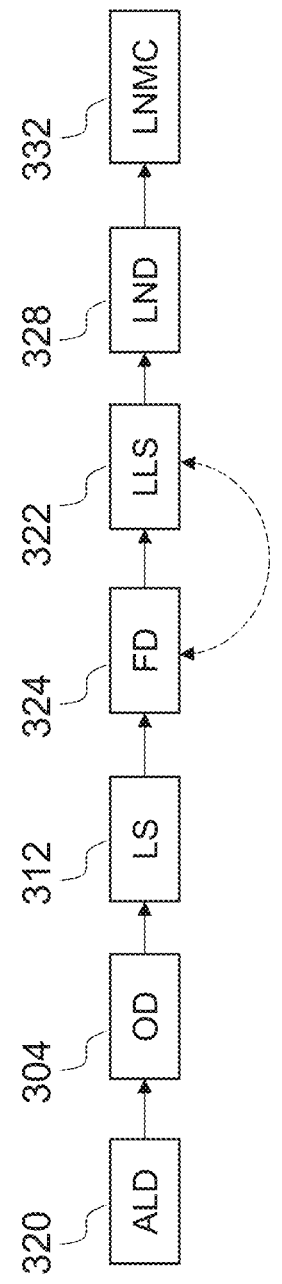
FIG. 4b is a schematic diagram illustrating a processing sequence for execution by an artificial intelligence system for abnormality identification and classification from chest CT images, according to an example embodiment.
Figure 4C:
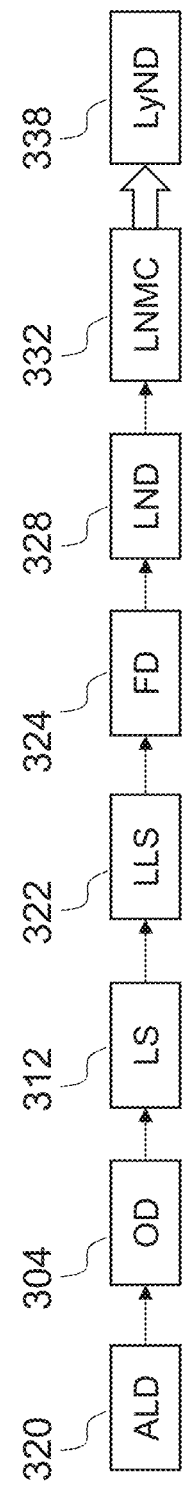
FIG. 4c is a schematic diagram illustrating a processing sequence for execution by an artificial intelligence system for abnormality identification and classification from chest CT images, according to an example embodiment.

In another example, if the fibrosis detection (FD) algorithm 324 finds significant parenchyma degeneration, the model 108 may determine that this information is relevant for the detection of lung nodules and may accordingly subsequently execute the lung nodule detection (LND) algorithm 328. Accordingly, the model 108 may determine that an improved result will be achieved by swapping the order in which the lung lobe segmentation (LLS) algorithm 322 and the fibrosis detection (FD) algorithm 324 are executed, as shown in the execution graph 402 shown in FIG. 4b.

In some embodiments, new algorithms may be added to the algorithm pool, algorithms may be removed from the algorithm pool, and/or models in the algorithm pool may be updated. The model 108 may be retrained to accommodate the updated algorithm pool.

In some embodiments, the model 108 may be trained to update the processing sequence during implementation of the algorithms prescribed by the processing sequence. For example, the model 108 may be trained to observe outputs from algorithms being executed according to the processing sequence and to adjust the sequence of algorithms to be subsequently executed depending on the output of already executed algorithms.

With respect to fixed processing sequences and processing sequences that are determined based on heuristics, the processing sequences generated by the model 108 may be improved in that they may provide more accurate results (i.e. may be more likely to produce the required output). For example, the model 108 may determine (e.g. from an output of the organ detection algorithm (OD) 304) that the image does not contain image data corresponding to a liver, in which case the model 108 may determine that there is no requirement to execute the diaphragm and liver segmentation (DLS) algorithm 318.

In another example, if the fibrosis detection (FD) algorithm 324 finds significant parenchyma degeneration, the model 108 may determine that this information is relevant for the detection of lung nodules and may accordingly subsequently execute the lung nodule detection (LND) algorithm 328. In turn if the lung nodule detection (LND) algorithm 328 detects lung nodules, the model 108 may determine that subsequently, for example, a lymph nodule segmentation algorithm (not shown) should be executed.

In another example, the model 108 may determine that the image was acquired without the presence of a contrast agent and accordingly may determine that the Pulmonary Embolism Detection (PED) algorithm 320 should be executed.

In another example, the model 108 may determine that the kilovolt acquisition parameter (of the acquired image) varies from a standard voltage (e.g. 120 kv) and may therefore determine that a normalization should be applied to the image before executing the bone mineral density measure (BMDM) algorithm 336.

In another example, the model 108 may determine that the age of the patient is below a threshold value and may accordingly determine that certain pediatric detector modules should be executed and/or that certain pediatric parameters be applied.

A processing sequence determined by the data processing system 100 described above with reference to FIG. 1 and performing the method described above with reference to FIG. 2, may provide an improved processing sequence and provide improved interoperability between independent algorithms within a processing sequence without specific knowledge of the algorithms and may enable dynamic changes of the algorithm pool, including updates to the individual algorithms, removal of algorithms and addition of new algorithms, without reprograming of the data processing system. Furthermore, a processing sequence determined by the data processing system 100 described above with reference to FIG. 1 and performing the method described above with reference to FIG. 2, may provide reduced errors and/or reduce execution of unnecessary or inappropriate algorithms.

While the invention has been illustrated and described in detail with the help of a preferred embodiment, the invention is not limited to the disclosed examples. Other variations can be deducted by those skilled in the art without leaving the scope of protection of the claimed invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of determining a processing sequence for processing an image, the processing sequence including a plurality of algorithms, each of the algorithms being configured to perform an image processing process on the image to generate an output, the method comprising;
    determining one or more required outputs to be output from the processing sequence;
    determining, using a data processing system, the processing sequence based on the one or more required outputs determined, the data processing system being configured based on sequences previously determined;
    receiving the output from a first algorithm in the processing sequence; and
    changing an order in which subsequent algorithms in the processing sequence are to be executed based on the output from the first algorithm received.

2. The method of claim 1, wherein the data processing system includes a data model, the data model representing a plurality of transition probabilities and a plurality of output probabilities,
    each of the transition probabilities representing a respective probability of a sequential order between respective algorithms, and
    each of the output probabilities representing a respective probability for each of the algorithms to generate a respective output.

3. The method of claim 2, wherein the data model is a Hidden Markov Model.

4. The method of claim 3, wherein the determining the processing sequence includes solving the Hidden Markov Model using a Viterbi algorithm.

5. The method of claim 2, wherein the data processing system includes producing an execution graph representing the processing sequence.

6. The method of claim 2, further comprising executing image processing algorithms according to the processing sequence determined.

7. The method of claim 1, wherein the required outputs include at least one of an image modification or an extraction of information from the image.

8. The method of claim 7, wherein the image modification includes at least one of,
    an annotation of the image,
    a measurement of one or more features identified in the image, or
    a highlighting of one or more portions of the image.

9. The method of claim 7, wherein the information includes at least one of an indication of an anatomical abnormality or a classification of the anatomical abnormality.

10. The method of claim 9, wherein the indication of an anatomical abnormality is based on a texture analysis of a portion of the image.

11. The method of claim 1, wherein the data processing system includes a data model, the data model being a Hidden Markov Model.

12. The method of claim 11, wherein the determining the processing sequence includes solving the Hidden Markov Model using a Viterbi algorithm.

13. The method of claim 1, wherein the data processing system includes producing an execution graph representing the processing sequence.

14. The method of claim 1, further comprising executing image processing algorithms according to the processing sequence determined.

15. A data processing system for determining a processing sequence for processing an image, the processing sequence including a plurality of algorithms, each of the algorithms being configured to perform an image processing process on the image to generate an output, the data processing system comprising:
    a processor arranged to,
        determine one or more required outputs to be output from the processing sequence;
        determine the processing sequence based on the one or more required outputs determined, the data processing system being configured based on previously sequences determined;
        receive the output from a first algorithm in the processing sequence; and
        change an order in which subsequent algorithms in the processing sequence are to be executed based on the output from the first algorithm received.

16. A non-transitory computer readable medium storing a computer program, the computer program including program code sections to make a data processing system execute the method of claim 1 when the computer program is executed in the data processing system.

* * * * *